F. SCHWARTZ & L. KLEINMANN.
SHOCK ABSORBER FOR TUNGSTEN LAMPS.
APPLICATION FILED MAY 6, 1909.
957,110.
Patented May 3, 1910.
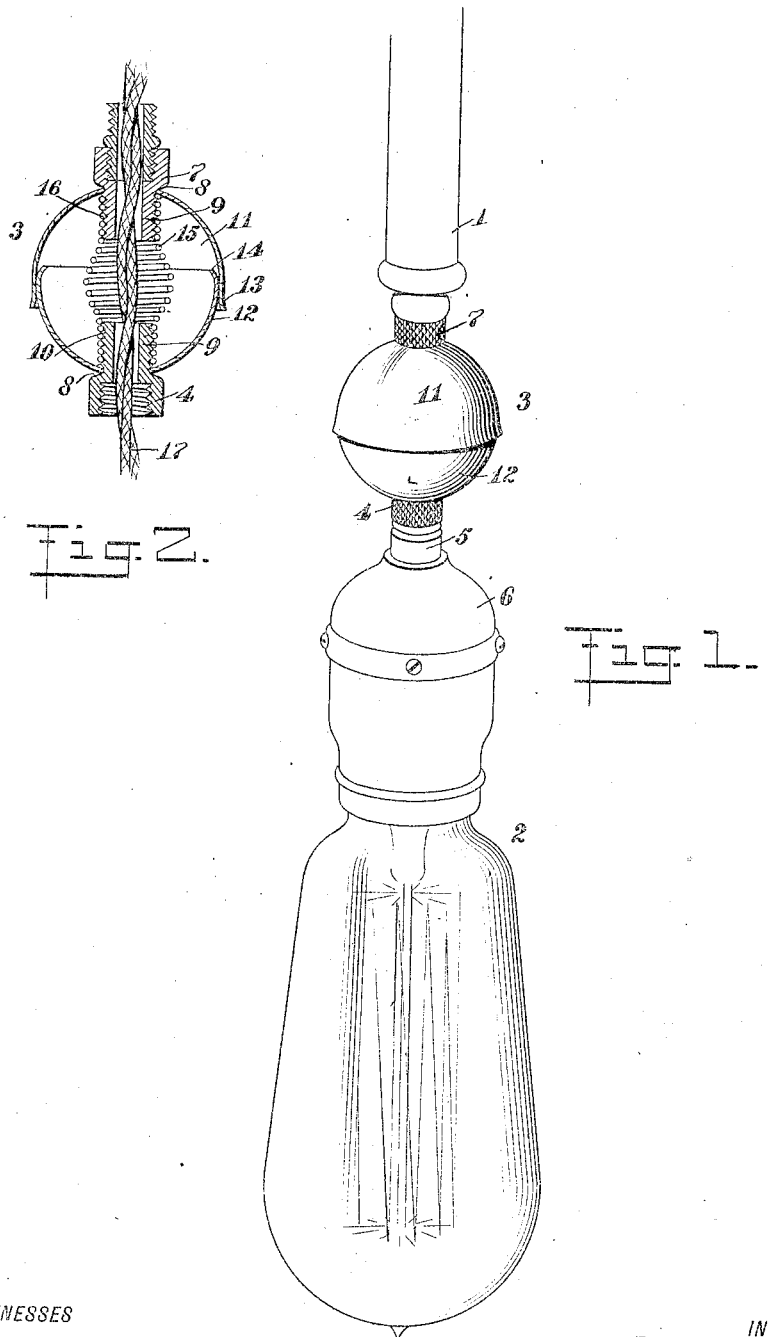
WITNESSES
INVENTORS
Frederick Schwartz
Leo Kleinmann
BY
ATTORNEYS

UNITED STATES PATENT OFFICE.

FREDERICK SCHWARTZ AND LEO KLEINMANN, OF NEW YORK, N. Y., ASSIGNORS TO SHAPIRO & ARONSON, OF BROOKLYN, NEW YORK, A FIRM.

SHOCK-ABSORBER FOR TUNGSTEN-LAMPS.

957,110.  Specification of Letters Patent.  Patented May 3, 1910.

Application filed May 6, 1909. Serial No. 494,212.

*To all whom it may concern:*

Be it known that we, FREDERICK SCHWARTZ and LEO KLEINMANN, both citizens of the United States, and residents of the city of New York, borough of Brooklyn, in the county of Kings and State of New York, have invented a new and Improved Shock-Absorber for Tungsten-Lamps, of which the following is a full, clear, and exact description.

This invention relates to hangers for lamps, and it is particularly useful in connection with electric lamps such as tungsten lamps having fragile filaments.

The object of the invention is to provide a lamp hanger having a shock absorbing device for supporting the lamp, which will operate to prevent the transmission of a jar or shock to the lamp, which might be otherwise transmitted from the ceiling or wall.

The invention consists in the construction and combination of parts to be more fully described hereinafter and particularly set forth in the claims.

Reference is to be had to the accompanying drawings forming a part of this specification, in which similar characters of reference indicate corresponding parts in both the figures.

Figure 1 is a perspective showing a lamp having a hanger provided with a shock absorber constructed according to our invention; and Fig. 2 is a vertical central section through our shock absorber.

Referring more particularly to the parts, 1 represents the lower end of the fixture from which the lamp 2 is hung. In applying our invention, between the fixture and the lamp we secure our shock absorber 3. The lower end of the shock absorber is provided with a tubular nipple 4, which is internally threaded, and which is attached to a threaded nipple 5 which projects up from the lamp socket 6. A threaded nipple 7, similar to the nipple 4, is provided at the upper end of the shock absorber, and this nipple enables the device to be attached to the lower end of the fixture.

The details of the construction of the shock absorber will now be described: The nipples 4 and 7 are enlarged at their outer ends so as to form heads, and present annular shoulders 8. The inner portions of the nipples are formed into reduced necks 9 which are formed with external screw threads 10. These necks 9 extend through openings formed at diametrically opposite points in two shells 11 and 12. These shells are of hemispherical form, as shown, and the edges of the openings through them seat upon the shoulders 8, as indicated. The shells 11 and 12 have telescoping edges and the edge of the shell 11 is bent outwardly so as to form a lip 13, whereas the edge of the shell 12 is bent inwardly so as to form a lip 14. The shells fit neatly together, but are movable with respect to each other. The two shells are held together by means of a coil spring 15. This spring is in the form of a helix having an expanded or enlarged body portion disposed between the nipples 4 and 7, and having reduced sleeves 16 at its ends which are of substantially the same diameter as that of the necks 9. The helix is of the same character as the threads on the necks 9, that is, if the threads are right-hand, the helix is also right-hand. The sleeves 16 are fastened to the nipples 4 and 7 by screwing the threaded necks of the nipples into the sleeves 16 so that the coils of the helix dispose themselves in the space between the threads, as indicated most clearly in Fig. 2. The nipples 4 and 7 are tubular, as indicated, so that an electric cord 17 may pass down through the hanger to the lamp bulb.

The presence of the spring 15 permits a rolling movement of the lower shell on the upper shell, and at the same time gives a desirable resiliency, so that a shock or jar conducted along the fixture 1 will be absorbed and not transmitted to the lamp. It should be evident from an inspection of Fig. 2 that a jar or shock passing in a vertical direction will be absorbed, and, furthermore, if the lamp should be struck it can incline in the direction in which the force tends to move it, which will prevent injury to the filament. It should be understood that the spring is normally not under tension, that is, it is in a relaxed condition.

Having thus described our invention, we claim as new and desire to secure by Letters Patent,—

1. A shock absorber for a lamp hanger, comprising a pair of shells having their edges overlapping and adapted to rock one upon the other, said shells forming a closed chamber and a tension spring extending across said chamber, connecting said shells and adapted to absorb a shock.

2. A shock absorber for a lamp hanger, consisting of a pair of curved shells telescoping at their edges, forming a closed chamber, and a tension spring attached to the inner side of said shells at substantially diametrically opposite points and extending across said chamber, said spring affording means for holding said shells together and permitting a rocking movement of said shells with respect to each other.

3. A shock absorber for a lamp hanger, consisting of a pair of curved shells telescoping at their edges, nipples mounted in said shells diametrically opposite to each other and adapted to attach the shock absorber in position, and a spring connecting said nipples and holding said shells together.

4. A shock absorber for a lamp hanger, consisting of a pair of oppositely disposed substantially hemispherical shells telescoping at their edges, nipples mounted in said shells diametrically opposite to each other and having threaded necks projecting inward, and a coil spring engaging the threads of said necks and holding said shells together.

In testimony whereof we have signed our names to this specification in the presence of two subscribing witnesses.

FREDERICK SCHWARTZ.
LEO KLEINMANN.

Witnesses:
F. D. AMMEN,
PHILIP D. ROLLHAUS.